March 19, 1968  F. J. COLVILLE ET AL  3,373,566
GAS TURBINE JET ENGINE POWERPLANT HAVING A JET NOZZLE
WITH A PLURALITY OF NOZZLE MEMBERS
Filed Oct. 5, 1966  2 Sheets-Sheet 1

Inventors
Francis Jeffrey Colville
George Samuel Kitson
By
Cushman, Darby & Cushman
Attorneys United States Patent Office 3,373,566
Patented Mar. 19, 1968

3,373,566
GAS TURBINE JET ENGINE POWERPLANT HAVING A JET NOZZLE WITH A PLURALITY OF NOZZLE MEMBERS
Francis Jeffrey Colville, Sutton-in-Ashfield, Nottingham, and George Samuel Kitson, Aspley, Nottingham, England, assignors to Rolls-Royce Limited, Derby, England, a British company
Filed Oct. 5, 1966, Ser. No. 584,474
Claims priority, application Great Britain, Oct. 19, 1965, 44,323/65
3 Claims. (Cl. 60—232)

ABSTRACT OF THE DISCLOSURE

Jet nozzles for aircraft vertical lift engines, the nozzles having a plurality of nozzle members located on a curved, rotatable, common duct and having an elliptical downstream end configuration. The oppositely located nozzle members adjacent the minor axis of the ellipse have their downstream ends inwardly inclined towards each other. When two or more such engines are vertically mounted side by side in an engine bay, the jet efflux from each engine will not impinge on the jet nozzle of the adjacent engine.

---

This invention concerns a jet nozzle for a gas turbine jet engine powerplant and, although the invention is not so restricted, it is more particularly concerned with a nozzle adapted for use on a gas turbine vertical lift engine.

The term "vertical lift engine" as used in this specification is intended to indicate an engine which is adapted to produce lift forces on an aircraft independently of those generated aerodynamically by forward flight of the aircraft. For this purpose the engine may have a thrust to weight ratio of at least 8:1 and preferably of at least 16:1.

According to the present invention, there is provided a jet nozzle for a gas turbine engine comprising a plurality of angularly spaced apart nozzle members which are mounted in a substantially elliptical configuration on a common duct so as to receive jet gases supplied to the latter, at least one pair of said nozzle members being oppositely disposed and having their downstream ends inwardly inclined towards each other, the said inwardly inclined downstream ends of the nozzle members being closest to the minor axis of the ellipse.

Preferably, said common duct is curved, means being provided for rotating the common duct about the longitudinal axis of the engine so that the direction of the jet efflux from the nozzle members changes with the rotation of the common duct, the axis of said downstream end being at an angle to the axis of the main portion of the respective nozzle member, the axis of each said downstream end is preferably at an angle (e.g., 10°) to the axis of the main portion of the respective nozzle member.

The invention also comprises a gas turbine vertical lift engine provided with a jet nozzle as set forth above.

Additionally, the invention comprises an aircraft having an engine bay in which is vertically mounted a plurality of gas turbine vertical lift jet engines, each said jet engine having a jet nozzle comprising a plurality of angularly spaced apart nozzle members which are mounted in a substantially elliptical configuration on a common duct so as to receive jet gases supplied to the latter, at least one pair of said nozzle members being oppositely disposed and having their downstream ends inwardly inclined towards each other, the said inwardly inclined downstream ends of the nozzle members being closest to the minor axis of the ellipse.

Figure 1:
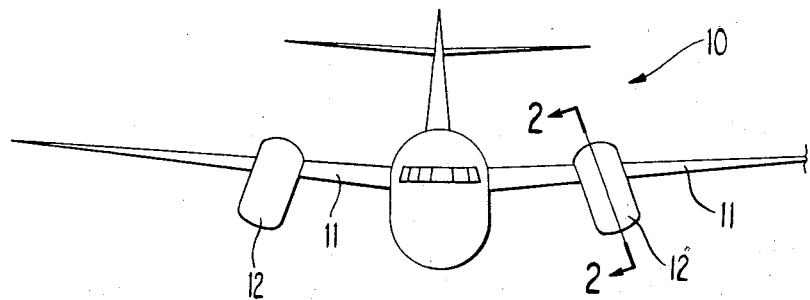
Figure 4:
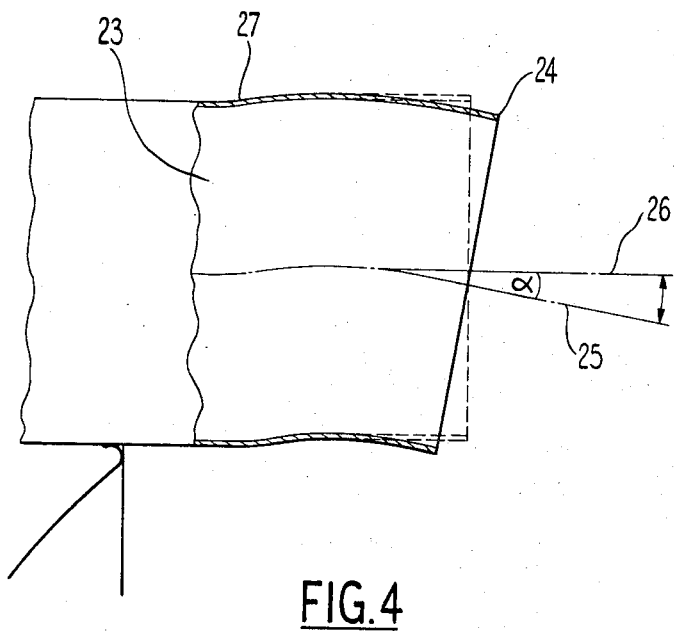
Figure 2:
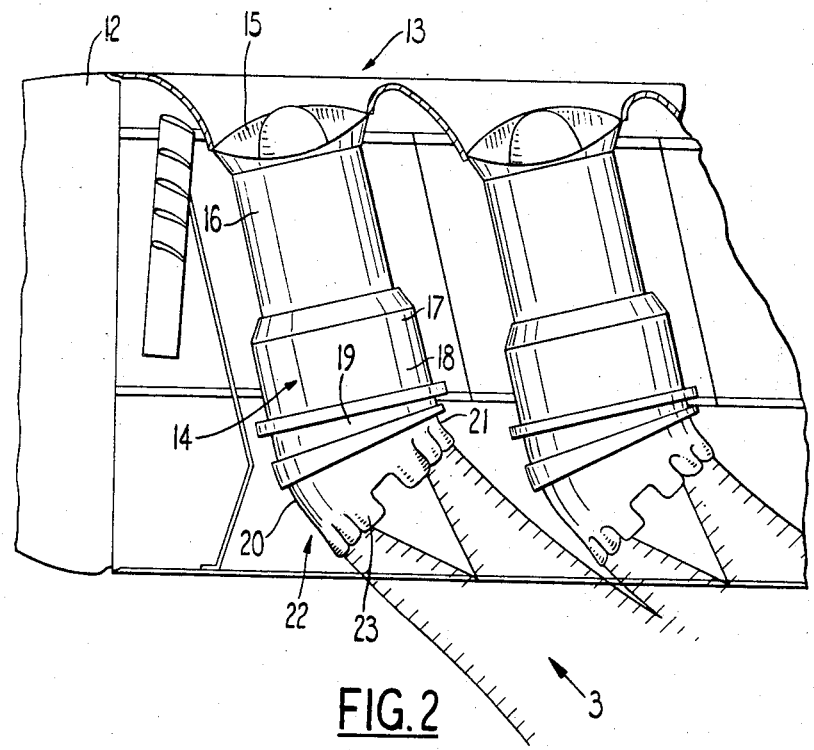
Figure 3:
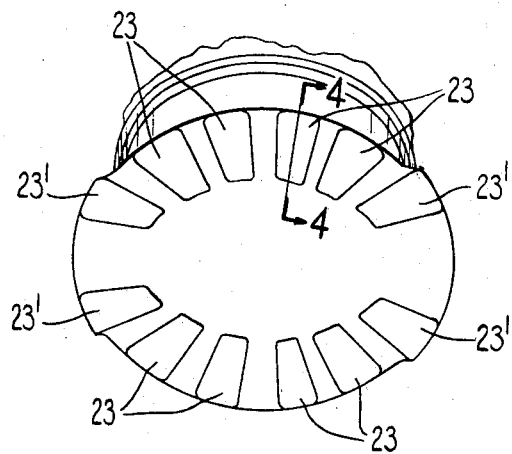

The invention is illustrated, merely by way of example, in the accompanying drawings, in which:

FIGURE 1 is a diagrammatic elevation of an aircraft having gas turbine vertical lift engines provided with jet nozzles in accordance with the present invention, FIGURE 2 is a broken-away sectional view taken on the line 2—2 of FIGURE 1, FIGURE 3 is a view looking in the direction of the arrow 3 of FIGURE 2, and FIGURE 4 is a broken-away part sectional view taken on the line 4—4 of FIGURE 3.

In FIGURE 1 there is shown an aircraft 10 having wings 11 in each of which is mounted a pod 12.

In each of the pods 12 there is an engine bay 13 (FIGURE 2) in which are mounted a plurality of gas turbine vertical lift engines 14. The longitudinal centre-line of each of the engines 14 is, as shown in FIGURE 2, disposed at an angle to the vertical.

Each of the engines 14 has an air intake 15, a compressor 16, combustion equipment 17 and a turbine 18, the turbine exhaust gases being discharged into an exhaust duct 19 which is bent so that its surface has radially inner and radially outer (with reference to the central vertical axis of the aircraft 10) curved portions 20, 21.

Mounted at the downstream end of the exhaust duct 19 is a jet nozzle 22, the assembly of jet nozzle 22 and exhaust duct 19 being rotatably mounted on the outer casing of the turbine 18.

Each of the jet nozzles 22 comprises a ring of twelve angularly spaced apart nozzle members 23, 23' which are mounted at the downstream end of the exhaust duct 19 so as to receive jet gases supplied to the latter.

The nozzle members 23, 23' of each jet nozzle 22 are arranged substantially in the form of an ellipse, as shown in FIGURE 3. The minor axis of the said ellipse is spaced from and lies between the radially inner and radially outer curved portions 20, 21. The downstream ends of the nozzle members 23, and thus the downstream ends of those nozzle members which are closest to the minor axis of the said ellipse, have their downstream ends 24 inwardly inclined towards each other. Thus, each of the ends 24, has its axis 25 at a small angle α, which may for example be 10°, to the axis 26 of the main portion 27 of the respective nozzle member 23. The remaining nozzle members, however, namely the nozzle members 23', have their downstream ends aligned with the main portions thereof.

Each of the jet nozzles 22 may be rotated between the position shown in FIGURE 2, in which its jet gases are both downwardly and rearwardly directed so as to have a forward component of thrust, and a position (not shown) in which the jet gases will be both downwardly and forwardly directed so as to have a rearward component of thrust. Thus as the duct 19 is rotated about the outer casing of the turbine 18, the direction of the jet efflux from the nozzle members 23, 23' is changed.

As will be seen from FIGURE 2, when the jet nozzles 21 are in the position shown in FIGURE 2, the jet efflux from each of them extends adjacent to, but does not strike, the jet nozzle of the adjacent engine.

The inward inclination of the downstream ends 24 of the nozzle members 23 assists in ensuring that the jet efflux from each engine does not strike the jet nozzle of the adjacent engine. Moreover, the substantially elliptical arrangement of the nozzle members 23, 23' has the effect of increasing the space both between the nozzle members 23' and between these members and the nozzle members 23, whereby to ensure that there is adequate ambient air surrounding each nozzle member so as to provide good mixing of the jet gases with the ambient air.

We claim:

1. A jet nozzle for a gas turbine engine comprising: a common duct, a plurality of angularly spaced apart nozzle members mounted in a substantially ellipitical configuration on said common duct so as to receive jet gases supplied to the latter, at least one pair of said nozzle members being oppositely disposed and having their downstream ends inwardly inclined towards each other, the said inwardly inclined downstream ends of the nozzle members being closest to the minor axis of the ellipse.

2. A jet nozzle as claimed in claim 1 wherein said common duct is curved, means for rotating the common duct about the longitudinal axis of the engine so that the direction of the jet efflux from the nozzle members changes with rotation of the common duct, the axis of each said downstream end being at an angle to the axis of the main portion of said respective nozzle members.

3. In an aircraft: an engine bay, a plurality of gas turbine vertical lift jet engines mounted substantially vertical in said engine bay, each said jet engine having a jet nozzle comprising a common duct, a plurality of angularly spaced apart nozzle members mounted in a substantially elliptical configuration on said common duct so as to receive jet gases supplied to the latter, and at least one pair of said nozzle members being oppositely disposed and having their downstream ends inwardly inclined towards each other, said inwardly inclined downstream ends of the nozzle members being closest to the minor axis of the ellipse.

References Cited
UNITED STATES PATENTS

| | | | |
|---|---|---|---|
| 2,935,842 | 5/1960 | Highberg et al. | 239—265.13 |
| 2,990,905 | 7/1961 | Lilley | 181—33.221 |
| 3,155,342 | 11/1964 | Bolkow et al. | 60—232 XR |
| 3,162,011 | 12/1964 | Mullins et al. | 60—232 XR |

CARLTON R. CROYLE, *Primary Examiner*.